INVENTOR
MIKLOS KORODI
ATTYS.

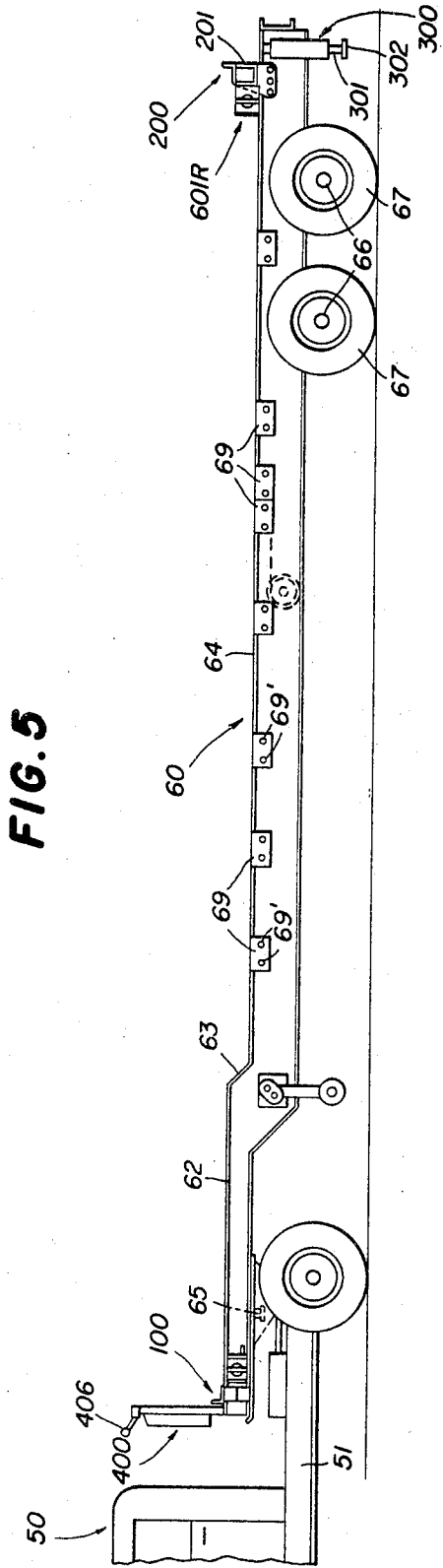
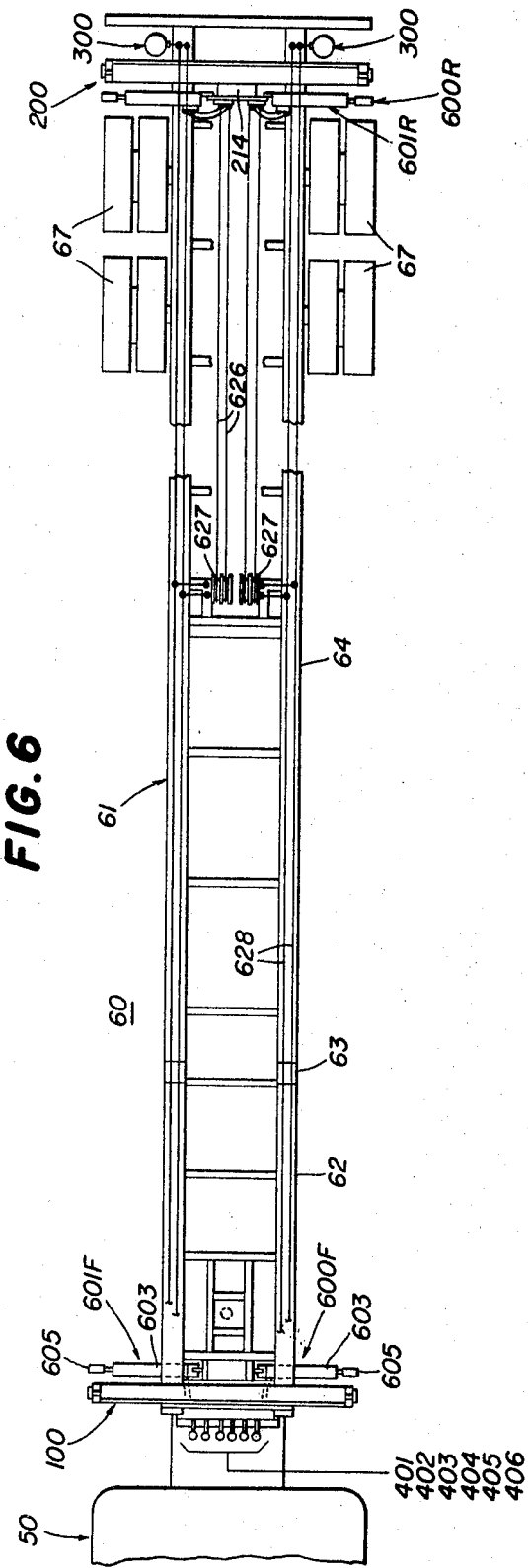
FIG. 5
FIG. 6

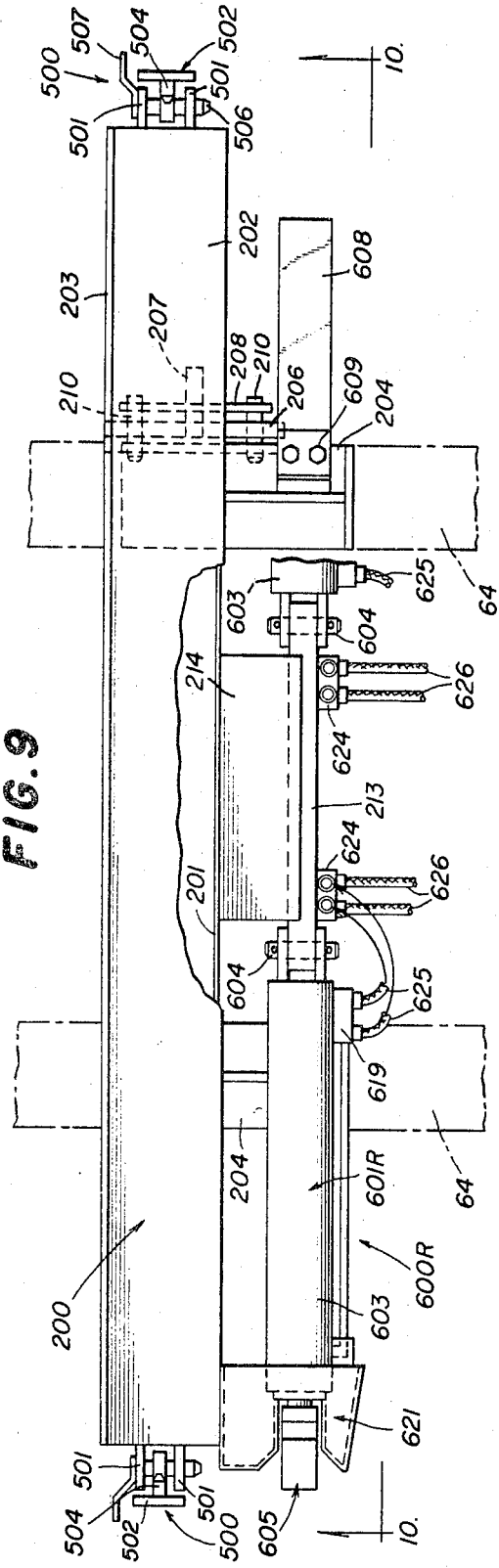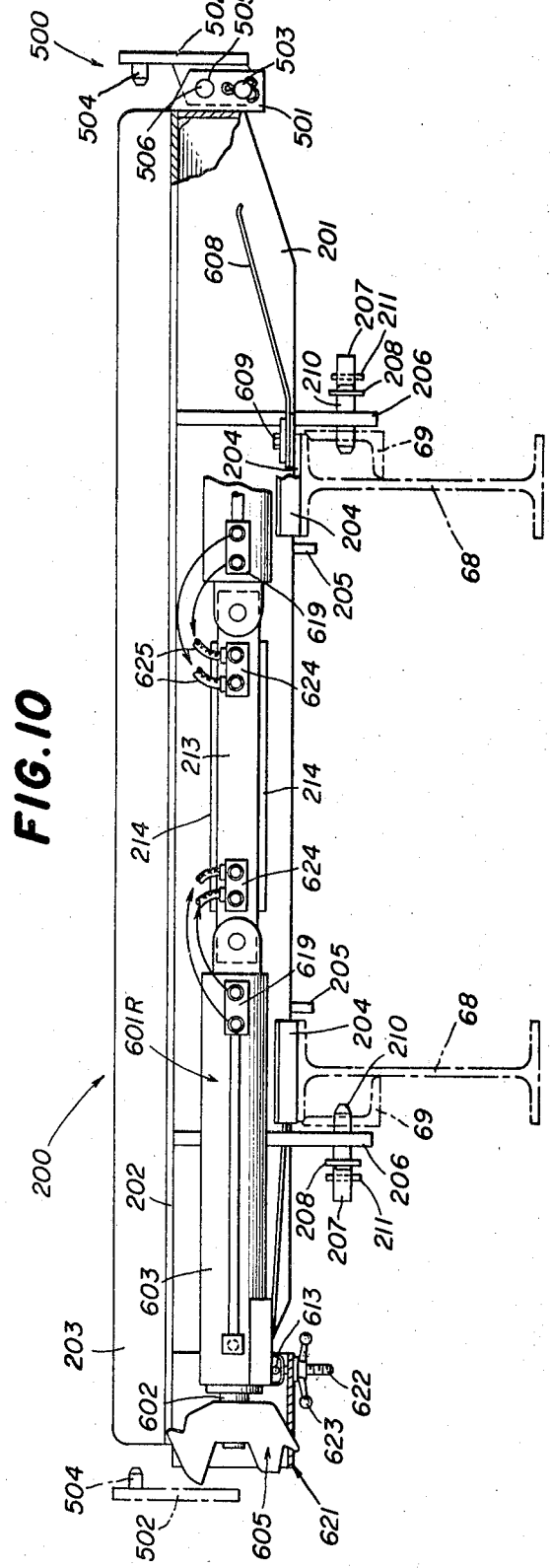

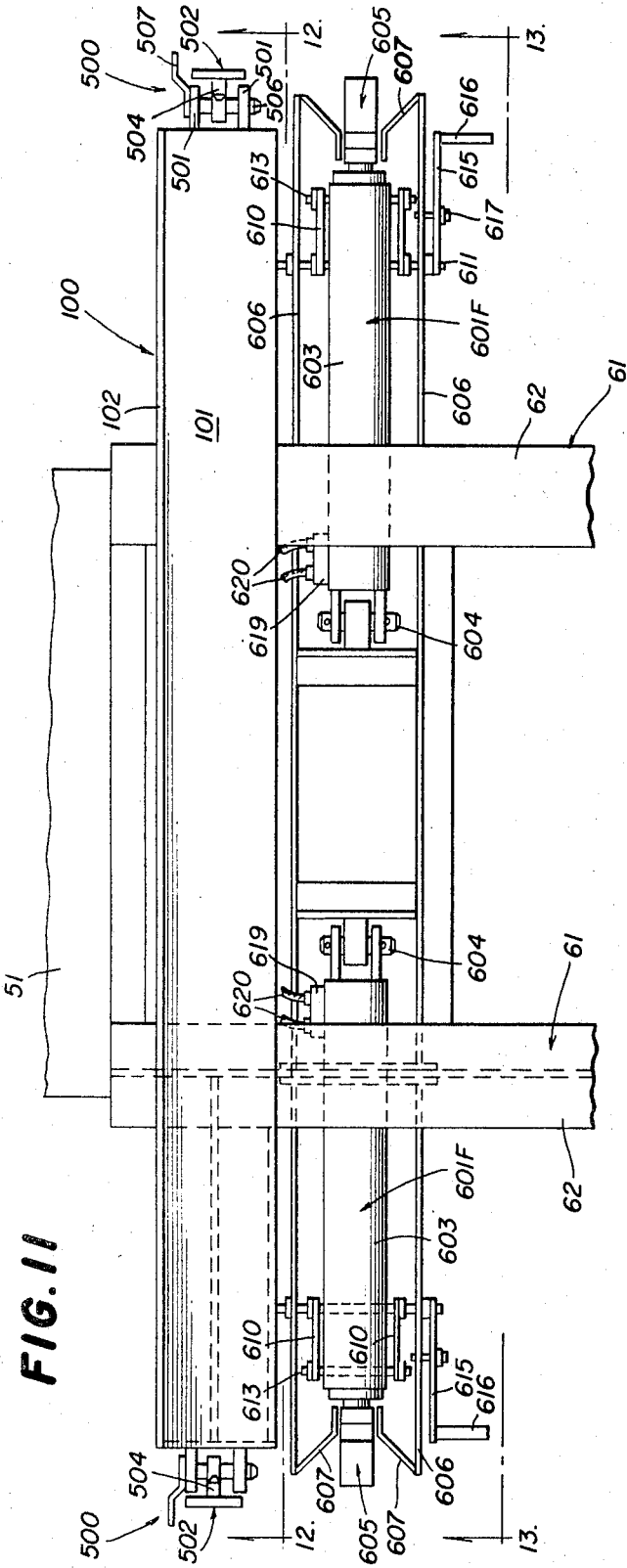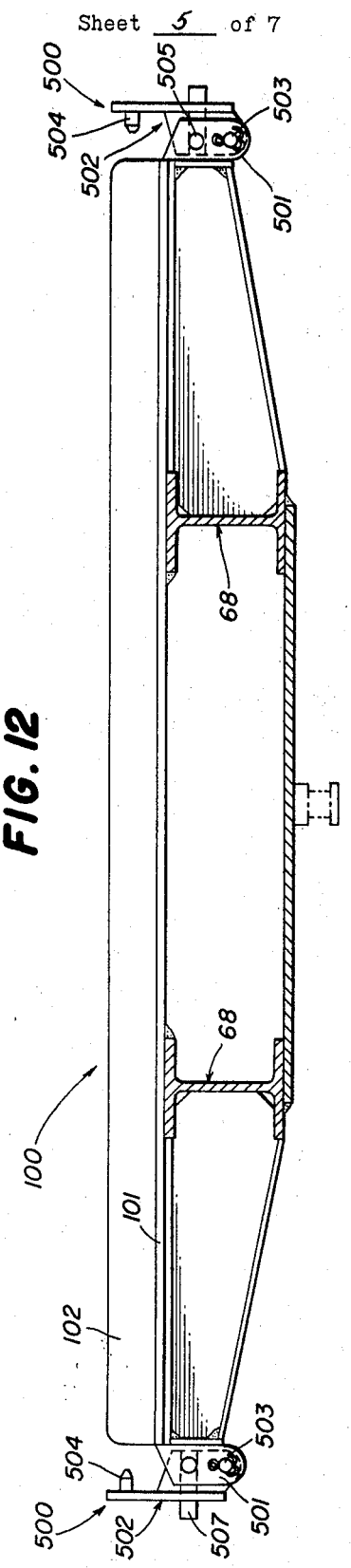
FIG. 11
FIG. 12

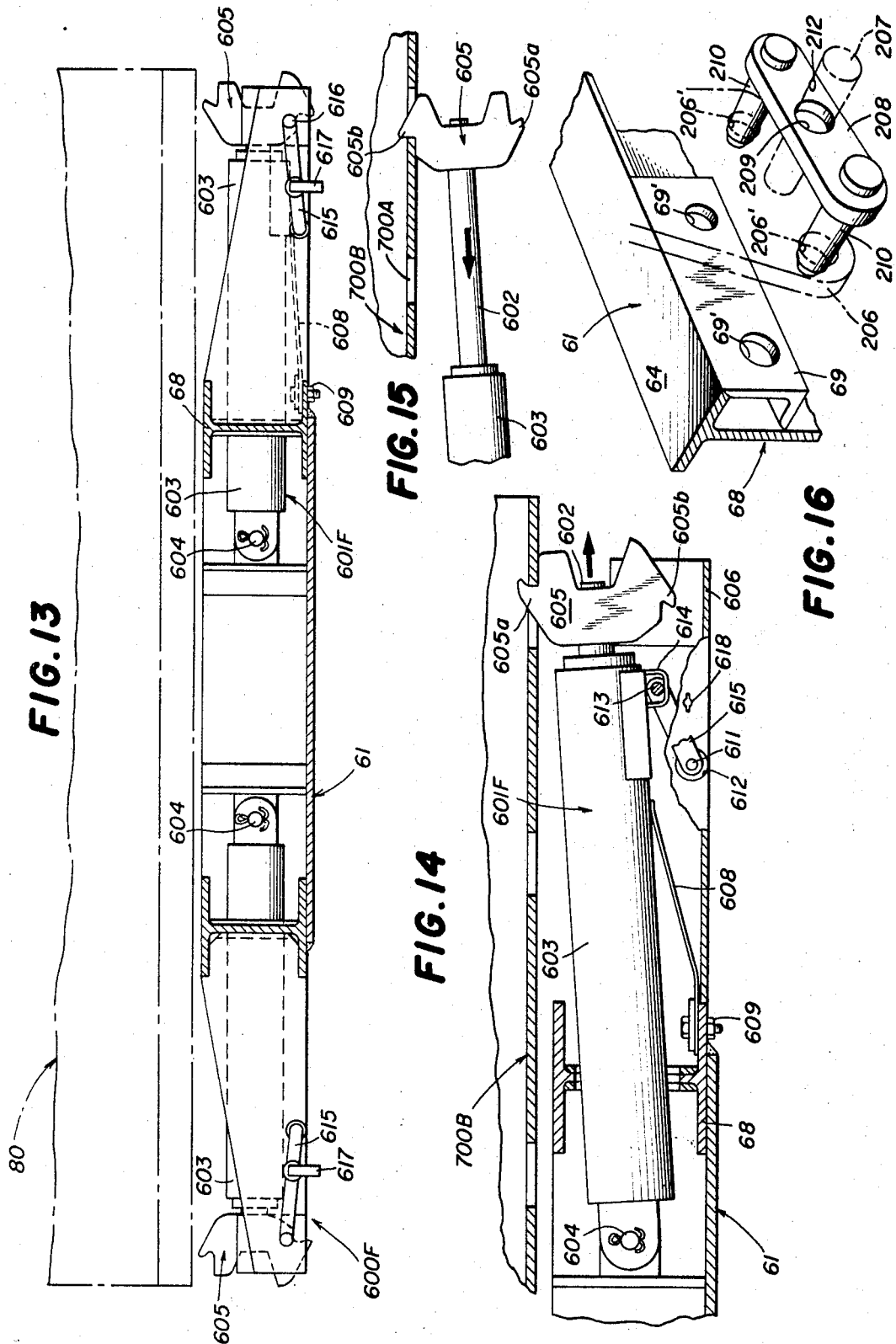

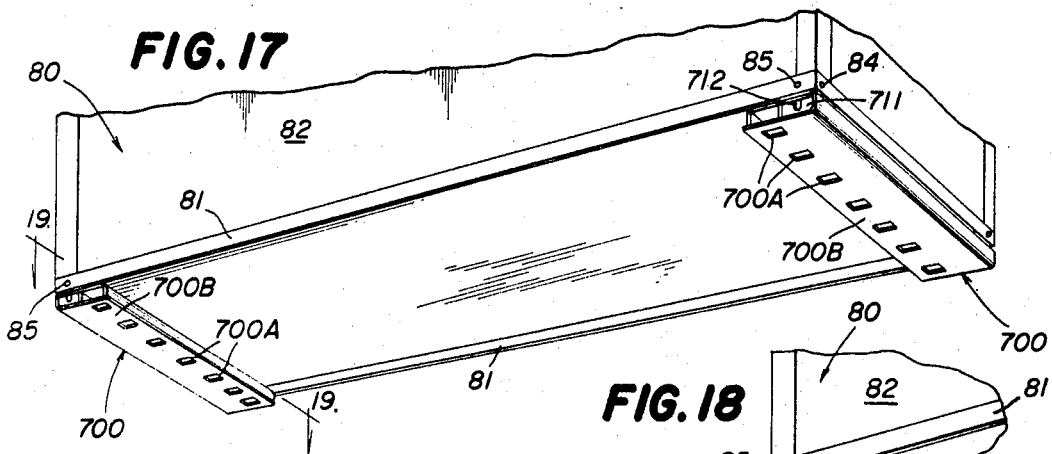
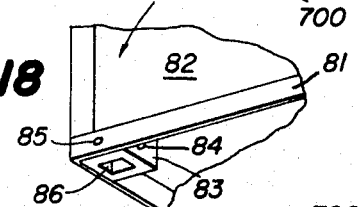
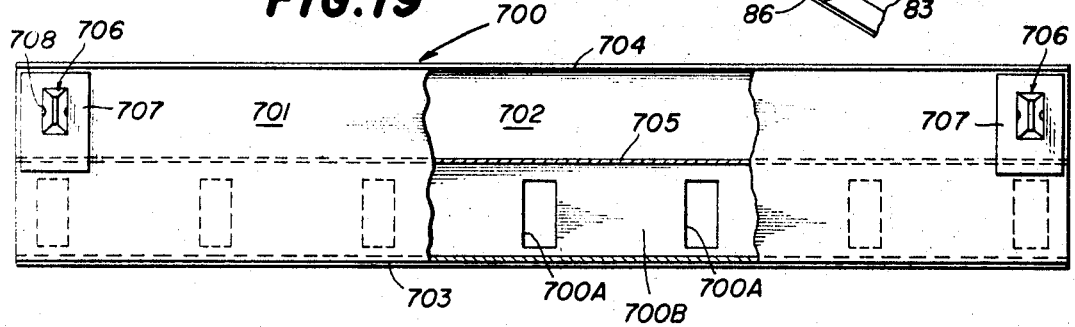
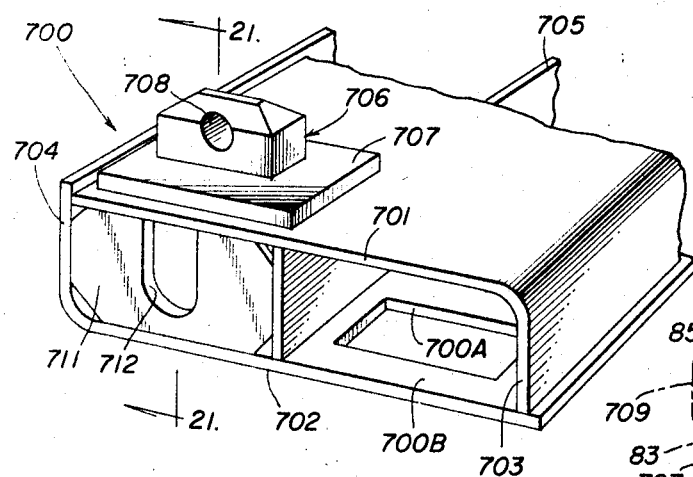
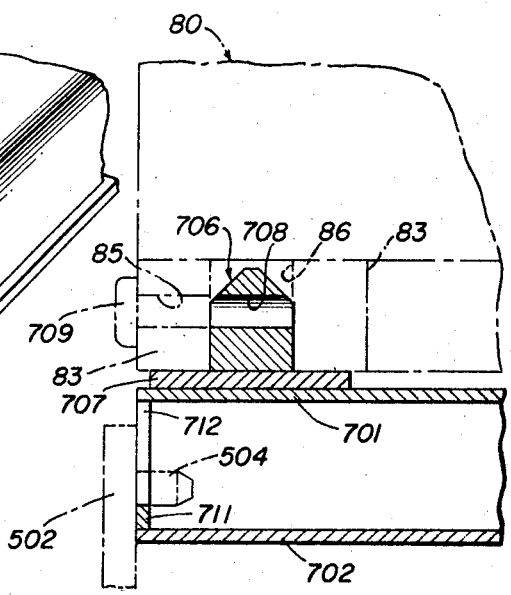

United States Patent Office 3,439,822
Patented Apr. 22, 1969

3,439,822
FREIGHT CONTAINERS PROVIDED WITH DETACHABLE END BOLSTERS
Miklos Korodi, Chicago, Ill., assignor to General American Transportation Corporation, Chicago, Ill., a corporation of New York
Filed June 2, 1967, Ser. No. 643,108
Int. Cl. B60p 1/64; B62d 27/06
U.S. Cl. 214—516      4 Claims

ABSTRACT OF THE DISCLOSURE

Detachable end bolsters for use in combination with a freight container carrying on the bottom thereof an elongated longitudinally extending and generally rectangular base and having a plurality of corner reinforcing members rigidly affixed to the respective corners thereof, wherein each of the bolsters comprises a rigid elongated hollow structure having generally parallel spaced-apart top and bottom walls and spaced-apart inner and outer side walls. Each of the bolsters includes means defining a row of longitudinally spaced-apart abutments on the bottom wall thereof and arranged substantially adjacent to the inner side wall thereof so as to provide a laterally extending rack thereon. The bolsters are adapted to be detachably secured to the respective opposite ends of the freight container whereby the freight container may be employed in a freight transportation system having side transfer facilities adapted to cooperate with the racks.

---

The present invention relates to freight transportation systems and more particularly to freight containers provided with detachable end bolsters, whereby the containers equipped with the detachable bolsters may be employed in a freight transportation system having side transfer facilities.

The majority of freight containers manufactured today are designed to be carried on railway flatcars, and the dead weight of the freight container therefore is not of great importance as a design factor. Because the dead weight of the freight containers is not critical, the containers are constructed of relatively heavy and strong materials, such as steel and steel alloys, whereby the containers are strong enough to be employed in conjunction with various side transferring devices. When used with side transferring facilities, the base of the freight container must be provided with heavy steel plates having racks thereon, which racks are adapted to cooperate with side transferring mechanisms of various types. In nautical shipping, however, the dead weight of the freight container is important, and the freight containers designed for nautical shipping therefore have to be made of a relatively light material, such as aluminum. An aluminum freight container, however, cannot normally be used with side transferring facilities because the high stresses applied to the base of such a container during side transferring would destroy it. As a result, the containers currently provided for use in the nautical shipping industry cannot be used in conjunction with freight transportation systems employing road vehicles equipped with side transfer facilities.

It is, therefore, a primary object of the invention to provide, in combination with a freight container having an elongated longitudinally extending and generally rectangular base, a pair of detachable end bolsters adapted to be secured to the base of the freight container whereby the freight container with the bolsters secured thereto may be employed in a freight transportation system having side transfer facilities adapted to cooperate therewith to effect sidewise transferring of the freight container, and whereby the freight container may be employed in a condition with the bolsters detached therefrom.

Another object of the invention is to provide a bolster comprising an elongated rigid and hollow structure adapted to be secured to the base of a freight container, whereby the bolster serves to strengthen the base of the freight container when secured thereto so that the freight container may be employed in a freight transportation system of the character noted.

In one aspect of the invention there is provided a freight container having an elongated horizontally extending and generally rectangular base. In combination with the container there is provided a pair of rigid and laterally extending bolsters respectively arranged adjacent to and below the opposite ends of the base. Each of the bolsters comprises a hollow structure having generally parallel spaced-apart top and bottom walls and spaced-apart inner and outer side walls. Each of the bolsters includes means defining a row of laterally spaced-apart abutments on the bottom wall thereof and arranged substantially adjacent to the inner side wall thereof so as to provide a laterally extending rack on the bottom wall. Fastening means is provided for detachably securing each of the bolsters respectively to the opposite ends of the base, whereby the freight container with the bolsters secured thereto may be employed in a freight transportation system having side transfer facilities adapted to cooperate with the racks to effect sidewise transferring of the freight container, and whereby the freight container may be employed in a condition with the bolsters detached from the base.

Further features of the invention pertain to the particular construction and arrangement of the elements of the freight transportation system, and particularly to the elements of a freight container and detachable bolsters therefor, whereby the above-outlined and additional operating features thereof are attained.

The invention, both as to its organization and method of operation, together with further objects and advantages thereof, will best be understood by reference to the following specification, taken in connection with the accompanying drawings, in which:

FIG. 5 is an enlarged side elevational view of the semi-trailer, similar to FIG. 1;

FIG. 6 is a plan view of the semi-trailer, as shown in FIG. 5;

FIG. 9 is an enlarged fragmentary plan view of the rear trailer bolster and the rear transfer mechanism, as shown in FIG. 6;

FIG. 10 is a front elevational view of the rear transfer mechanism and the rear trailer bolster taken in the direction of the arrows along the line 10—10 of FIG. 9;

FIG. 11 is an enlarged fragmentary plan view of the front trailer bolster and the front transfer mechanism, as shown in FIG. 6;

FIG. 12 is an elevational view of the front trailer bolster taken in the direction of the arrows along the line 12—12 of FIG. 11;

FIG. 13 is a front elevational view of the front transfer mechanism taken along the line 13—13 of FIG. 11;

FIG. 14 is an enlarged fragmentary lateral sectional view of the semi-trailer and the rear detachable bolster carried by the short container, this view being similar to the view shown in FIG. 13, and illustrating in greater detail the position of one of the mechanisms for transferring the freight container from the semi-trailer;

FIG. 15 is a reduced fragmentary lateral sectional view of the parts shown in FIG. 14, illustrating in greater detail the mechanism for transferring the freight container onto the semi-trailer;

FIG. 16 is an exploded perspective view of a locking mechanism used to hold the rear trailer bolster in selected positions on the chassis, as shown in FIG. 8;

FIG. 17 is an enlarged fragmentary bottom perspective view of the short freight container carrying a pair of detachable container bolsters embodying the present invention;

FIG. 18 is an enlarged fragmentary bottom perspective view of one corner of a freight container similar to the container shown in FIG. 17, without the detachable container bolster secured thereto;

FIG. 19 is an enlarged plan view of one of the detachable container bolsters carried by the freight container shown in FIG. 17, taken in the direction of the arrows along the line 19—19 in FIG. 17;

Figure 1:
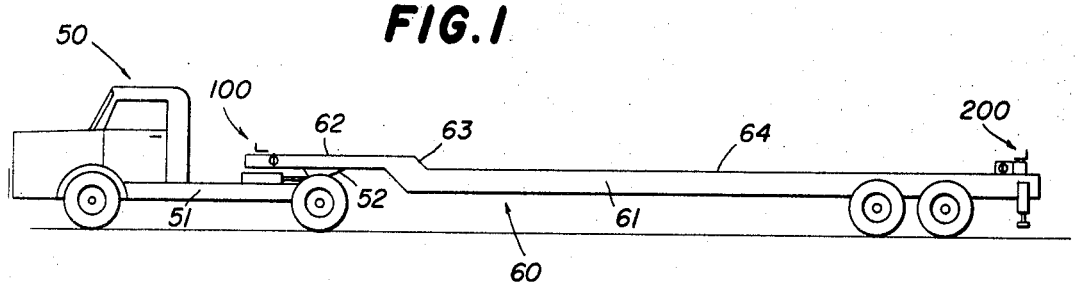
FIGURE 1 is a side elevational view of a road semi-trailer provided with side transferring facilities.

FIG. 20 is an enlarged fragmentary perspective view of the detachable end bolster shown in FIG. 19, illustrating various features thereof in greater detail; and FIG. 21 is a fragmentary sectional view of the detachable container bolster taken along the line 21—21 of FIG. 20, showing one arrangement for detachably securing the container bolster to an associated freight container and the manner in which the container bolster is anchored to the road semi-trailer.

Referring now to FIGURES 1 through 6, inclusive, of the drawings, the freight transfer system there illustrated, with which a freight container equipped with detachable container bolsters embodying the features of the present invention may be employed, essentially comprises a road tractor 50, a road semi-trailer 60, a long freight container 70, a short freight container 80 and an associated railway flatcar 90. The tractor 50 is of conventional construction, including a chassis 51 carrying at the rear end thereof a fifth-wheel mechanism 52 capable of vertical adjustment or elevation in the usual manner, which mechanism 52 is adapted selectively to clutch and to unclutch a cooperating kingpin also in the usual manner. The railway flatcar 90 is also of conventional construction, including the usual underframe 91 carrying a flat deck 92, the underframe 91 being supported adjacent to the opposite ends thereof by wheeled trucks, indicated at 93.

Figure 2:
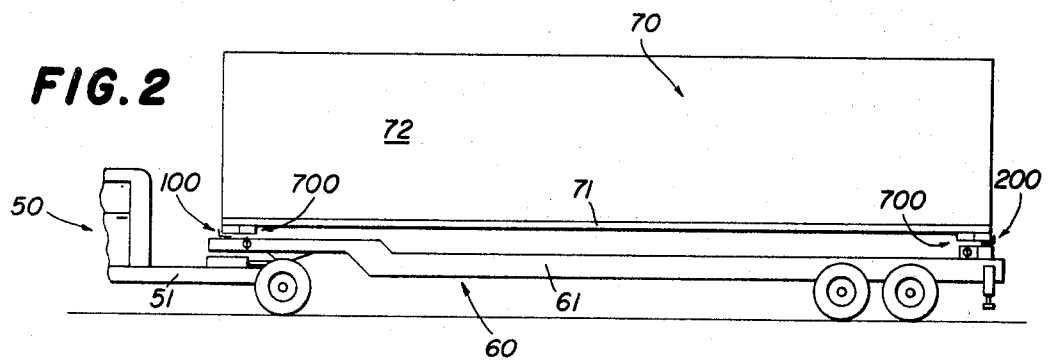
FIG. 2 is a fragmentary side elevational view of the semi-trailer of FIG. 1, illustrating a single long freight container embodying the present invention loaded thereupon.
Figure 3:
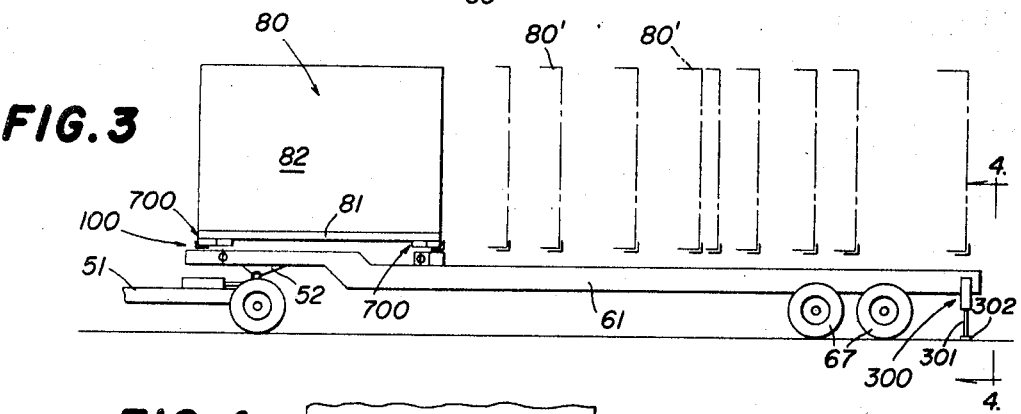
FIG. 3 is a side elevational view of the semi-trailer of FIG. 1, illustrating a short freight container embodying the present invention loaded thereupon, and wherein containers of various other lengths are shown in dashed lines.
Figure 4:
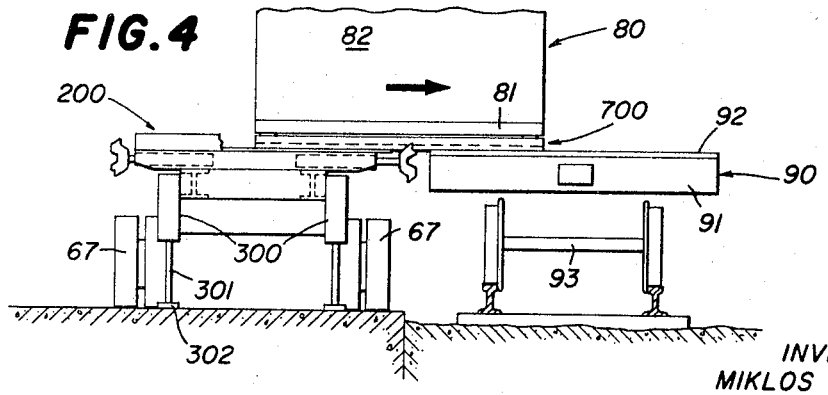
FIG. 4 is an enlarged fragmentary end view of the semi-trailer taken in the direction of the arrows along the line 4—4 in FIG. 3, and illustrating the side transfer of the short freight container embodying the present invention onto the semi-trailer from an associated railway flatcar.

The semi-trailer 60 comprises an elongated longitudinally extending chassis 61, having a first horizontal section 62, a downwardly inclined section 63, and a second lower horizontal section 64. As seen in FIG. 6, the chassis 61 is substantially rectangular in plan and of open skeleton-like construction; the chassis 61 being adapted to carry the single long freight container 70, as indicated in FIG. 2, or the short freight container 80, as indicated in FIG. 4, as well as containers of various other lengths as indicated by the dashed lines 80' in FIG. 3. The chassis 61 has a length of about 40 feet, since most large containers now in use have lengths that are multiples of ten feet, twenty-foot and forty-foot containers being quite common.

The front central portion of the chassis 61 carries a depending kingpin, indicated at 65 in FIG. 5, that may be selectively clutched and declutched by the fifth-wheel mechanism 52 in the usual manner; and the rear end of the chassis 61 is supported by a pair of laterally extending and longitudinally spaced-apart axles 66 carrying at the opposite outer ends thereof road wheels 67 in the usual manner.

The long freight container 70 comprises an elongated longitudinally extending generally rectangular base 71 carrying an upstanding hollow body or housing 72 provided with door structure, not shown, and defining a lading chamber, in the usual manner. Likewise, the short freight container 80 comprises an elongated longitudinally extending generally rectangular base 81 carrying an upstanding hollow body or housing 82 provided with door structure, not shown, and defining a lading chamber in the usual manner. It will, of course, be understood at this time that such structure is conventional, and that freight containers of various other lengths, indicated by the dashed lines 80' in FIG. 3, are also constructed in this manner.

Referring now more particularly to FIGS. 5 and 6, the semi-trailer 60 further comprises a first laterally extending trailer bolster 100 rigidly secured to the front end of the horizontal section 62 of the chassis 61. A second laterally extending trailer bolster 200, longitudinally spaced from the front trailer bolster 100, is carried by the second horizontal section 64 of the chassis 61. The rear trailer bolster 200 is movable longitudinally relative to the chassis 61 in a manner hereinafter described.

A pair of laterally spaced-apart elevator motors 300 is carried by the extreme rear end of the chassis 61, respectively adjacent to the opposite sides thereof and below the top of the rear horizontal section 64. Each of the motors 300 is of the piston-cylinder type and is selectively operated to effect expansion and contraction of an associated piston rod 301, so as to effect corresponding downward and upward movements of a foot 302 carried on the extreme lower end of the piston rod 301, as indicated in FIG. 4 (also, see FIGS. 2 and 3). The motor 300 is entirely conventional and is of the hydraulic operated type. Thus, the two motors or elevators 300 may thrust the corresponding feet 302 downwardly, as shown in FIG. 3, to level the chassis 61 so that it is parallel to the plane of the deck 92 of the railway flatcar 90, as indicated in FIG. 4. When lowered, the feet 302 also fix the chassis 61 with respect to the rear wheels 67, thereby to prevent tilting of the chassis when transferring containers thereover.

As shown in FIGS. 5, 7, 11 and 12, the front trailer bolster 100 is rigidly secured to the front end of the chassis 61 immediately rearwardly of a control console 400 that is mounted on the foremost edge of the chassis 61. The trailer bolster 100 extends laterally of the chassis 61 and essentially comprises a substantially horizontal supporting plate 101, carrying an upstanding guard and guide structure 102 at the front edge thereof, whereby the front trailer bolster 100 is adapted to receive and support the front end of any one of the various length freight containers 70, 80 or 80', as indicated in FIGS. 2 and 3. The opposite outer ends of the front trailer bolster 100 respectively carry a pair of anchoring devices, indicated at 500; which pair of anchoring devices 500 respectively cooperate with the opposite front corners of a mounted container 70, 80 or 80', as explained more fully hereinafter.

As best shown in FIGS. 5 and 8 through 10 inclusive, the rear trailer bolster 200 comprises an elongated laterally extending substantially U-shaped channel member 201, to the top of which is rigidly secured a substantially horizontal supporting plate 202 carrying an upstanding guard and guide structure 203 at the rear edge thereof.

A pair of longitudinally extending and laterally spaced-apart bearing plates 204 is rigidly secured to the base of the channel member 201. As best seen in FIGS. 9 and 10, the bearing plates 204 are of substantially the same width as the top surface 64 of the I-beams 68 which form the structural sections of the chassis 61. A pair of downwardly depending bars 205 (FIG. 10), is rigidly secured to the base of the channel member 201 inwardly of the respective bearing plates 204. Upon placement of the trailer bolster 200 on the chassis 61, the bearing plates 204 reside on the top surfaces 64 of the I-beams 68; while the downwardly depending bars 205 prevent lateral movement of the trailer bolster 200 relative to the chassis 61.

The channel member 201 is dimensioned such that with the bearing plates 204 and the support plate 202 fastened thereto, the support plate 101 of the front trailer bolster 100 and the support plate 202 of the rear trailer bolster 200 are in a generally horizontal plane. The front end of each of the bearing plates 204 is upwardly inclined to facilitate movement of the rear trailer bolster 200 along the chassis 61.

The opposite outer ends of the rear trailer bolster 200 also each respectively carry an anchoring device, indicated at 500; which pair of anchoring devices 500 respectively cooperate with the opposite rear corners of a mounted container 70, 80 or 80', as explained more fully hereinafter.

As shown in FIGS. 8 to 10 and 16, a suitable locking arrangement is provided whereby the movable rear trailer bolster 200 may be seelctively positioned longitudinally along the chassis to accommodate freight containers of various lengths, while simultaneously precluding longitudinal movement of the rear trailer bolster 200 when a freight container is mounted thereon. With reference to FIGS. 5 and 16, it will be seen that the chassis 61 has a series of longitudinally spaced-apart plates 69 mounted thereupon, immediately below the top surface of section 64 thereof. Each of the plates 69 has a pair of spaced-apart openings 69' therethrough. A pair of downwardly depending plates 206 is rigidly affixed to the support plate 202 and the channel member 201. The plates 206 are spaced slightly outwardly of the respective bearing plates 204 and when the rear trailer bolster 200 is mounted on the chassis, the lower part of each plate 206 is adapted to overlie the plates 69 in the chassis. Further, each plate 206 has a pair of openings 206' therethrough (FIG. 16). The openings 206' are spaced-apart the same distance as the openings 69' in the plates 69, whereupon moving the rear trailer bolster 200 longitudinally of the chassis to a selected position, the openings 206' in the plates 206 will be in alignment with the corresponding openings 69' in the plates 69. Each plate 206 further includes an outwardly extending shaft 207 rigidly secured thereto intermediate the openings 206'.

To lock the rear trailer bolster 200 in a selected position relative to the front trailer bolster 100, a locking plate 208 having a central opening 209 and a pair of spaced-apart projections 210 is inserted over each plate 206, whereupon the projections 210 are adapted to pass through the corresponding aligned openings 206' in the plate 206 and 69' in the plate 69, while the outwardly extending shaft 207 is adapted to pass through the center opening 209 in the locking plate 208. A suitable lock pin 211 may then be passed through an opening 212 in the shaft 207 to prevent lateral movement of the locking plate 208 relative to the plate 206. The shafts 210 cooperate with the plates 206 and 69 to preclude longitudinal movement of the rear trailer bolster 200 relative to the chassis.

The plates 69 are located such that the rear trailer bolster 200 may be selectively positioned substantially about 14 feet, 17 feet, 20 feet, 24 feet, 27 feet, 28 feet, 30 feet, 35 feet, or 40 feet from the front trailer bolster, measured from the inside of the guide structures 101 and 203 respectively, thereby to accommodate freight containers having bases thereon corresponding to the aforementioned dimensions. Of course, suitable tolerances should be provided to prevent the base of an associated container from binding against the upstanding guide walls 101 and 203 of the respective trailer bolsters.

Referring once again to FIGS. 5 and 6, the front portion of the chassis 61 carries a first side transfer mechanism, designated generally as 600F, arranged immediately below the front trailer bolster 100 and substantially adjacent thereto. Also, as shown generally in FIGURES 5 and 6, a second side transfer mechanism, designated generally as 600R, is carried by the rear trailer bolster 200 and is movable therewith longitudinally of the chassis. Each of the side transfer mechanisms comprises a pair of motors 601F and 601R, respectively, disposed in laterally spaced-apart relation and adjacent to opposite sides of the chassis 61.

Each motor of the pairs of motors 601F and 601R is of the piston-cylinder type and includes a piston rod 602 that may be selectively reciprocated between expanded and contracted positions with respect to the associated cylinder 603. The motors 601F and 601R are of the hydraulic operated type and are of substantially conventional construction.

Figure 7:
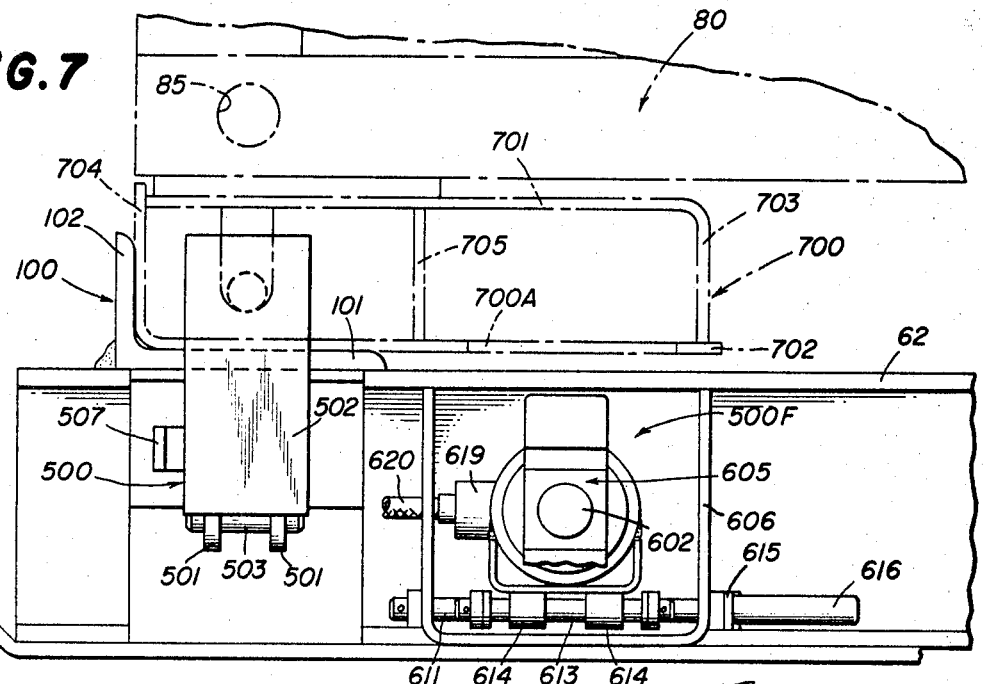
FIG. 7 is an enlarged fragmentary side elevational view of one end of the front trailer bolster and the front transfer mechanism carried by the front end of the chassis of the road semi-trailer, as shown in FIG. 5.
Figure 8:
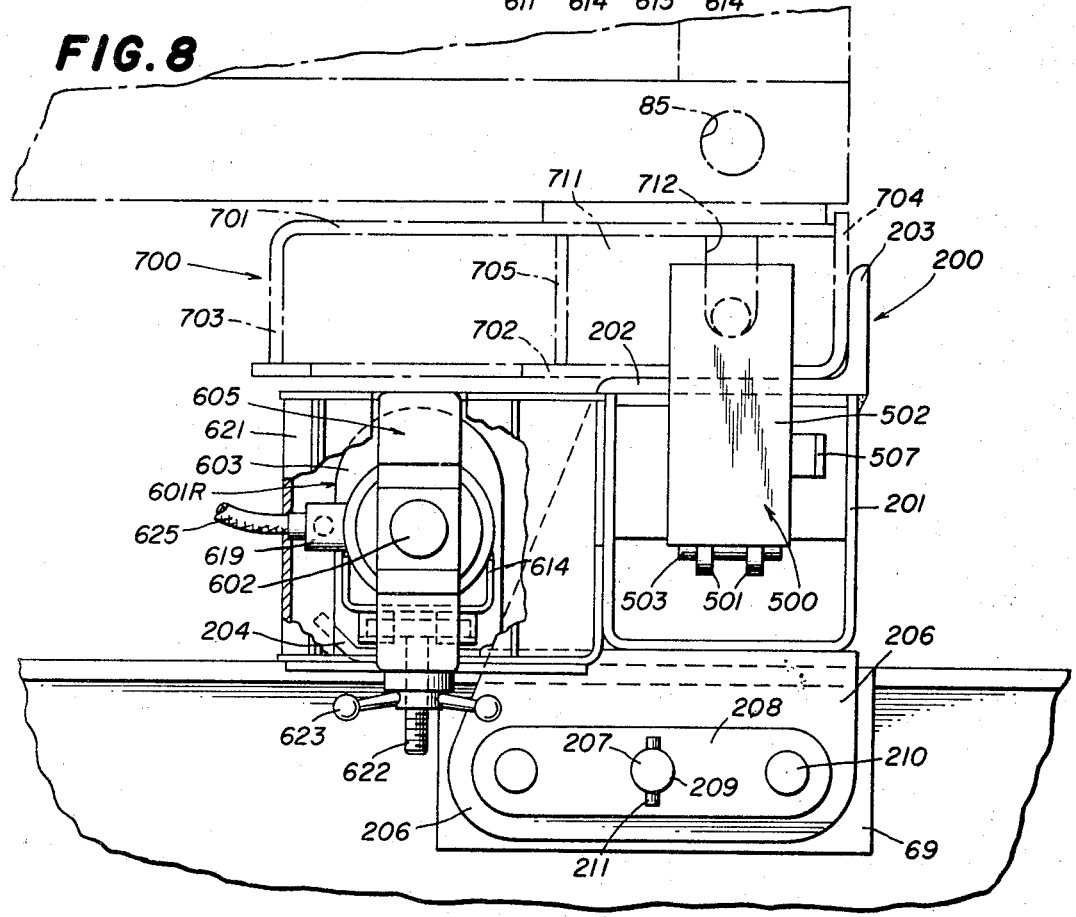
FIG. 8 is an enlarged fragmentary side elevational view of one end of the rear trailer bolster and the rear transfer mechanism carried thereby, as shown in FIG. 5.

The arrangement and operation of the front motors 601F will best be understood by reference to FIG. 14, wherein the mounting of one of the motors 601F is illustrated in some detail. More particularly, the rear end of the cylinder 603 of the motor 601F is pivotally mounted upon the adjacent side of the chassis 61 by an arrangement including a pivot pin 604; whereby the motor 601F projects laterally from the side (the right-hand side, as illustrated) of the chassis 61 and outwardly therebeyond; and whereby the centerline of the piston rod 602 is disposed substantially normal to the longitudinal centerline of the chassis 61. The extreme outer end of the piston rod 602 carries a pawl 605 that is employed in side loading and in side unloading of the freight containers 70, 80 or 80' with respect to the chassis 61, as explained more fully hereinafter. When the piston rod 602 is contracted, the pawl 605 is disposed near the adjacent right-hand side of the chassis 61; and when the piston rod 602 is expanded, the pawl 605 is disposed laterally well outwardly from the adjacent right-hand side of the chassis 61. As seen in FIGS. 7, 11 and 12, a U-shaped member 606 extends outwardly from the chassis 61 and past the end of the cylinder 603, where the outer end thereof is inwardly turned at 607 to provide a shield for each of the front motors 601F. The inwardly turned ends 607 define a passage through which the piston rod 602 and the pawl 605 are adapted to reciprocate.

The cylinder 603 has an upper or operative position as shown in FIG. 14, and a lower or storage position as shown in FIG. 13. The cylinder 603 is biased into its upper position by an arrangement including an upwardly biased leaf spring 608 that is rigidly secured at one end thereof, by way of a bolt 609, to the bottom surface of the I-beams 68 of the chassis 61. The opposite end of the spring 608 exerts an upward bias on the bottom of the cylinder 603 as shown in FIG. 14; whereby the biasing of the cylinder 603 pivots the same upwardly about the pivot pin 604 and into its operative position.

The cylinder 603 may be moved downwardly to its storage position against the bias of the spring 608 causing corresponding pivoting of the cylinder 603 downwardly about the pivot pin 604, by an arrangement including a pair of links 610 disposed respectively adjacent to opposite sides of the cylinder 603. The inner end of each link 610 is rigidly connected to a shaft 611. The shaft 611 extends laterally below the cylinder and through a pair of aligned openings 612 in the side walls of the channel member 606 adjacent each front motor, where the shaft 611 is rotatably mounted. The outer end of each link 610 is rigidly secured to a second laterally extending shaft 613 that passes through two downwardly depending lugs 614 that are rigidly secured to the bottom of the cylinder 603 at the outer end thereof. Rigidly fastened to one end of the shaft 611 is a second link 615 having a handle 616 affixed to the opposite end thereof. It will be readily understood that by depressing the handle 616, the shaft 611 and thereby the links 610 are rotated downwardly, causing the shaft 613 to press downwardly against the lugs 614 on the bottom outer end of the cylinder 603, thereby moving the cylinder 603 downwardly from its position of FIG. 14 and into its previously mentioned storage position. To lock the handle 616 in the storage position, a locking pin 617 is movably carried by the link 615 for lateral movement with respect thereto. A suitable aperture 618 (FIG. 14) is provided in the member 606, which aperture 618 accommodates lateral movement therethrough of the locking pin 617. Thus, upon rotating the handle 616 downwardly to the lock position, the locking pin 617 may be laterally shifted into the aperture 618, thereby to restrain the cylinder 603 against the biasing spring 608 and prevent upward movement of the cylinder 603 to its operating position.

To complete the description of the front motors 601F, it will be observed that each motor includes at the inner end thereof a junction box 619 to which is respectively connected a pair of flexible conduits 620. The conduits 620 are appropriately interconnected to the control console 400 that is carried on the front end of the chassis 61. The control console 400 is operatively connected, when the semi-trailer 60 is coupled to the tractor 50, to a hydraulic pumping system provided in the tractor 50 of conventional construction and arrangement.

As seen in FIGS. 6 and 8 through 10, the rear motors 601R also include the pivotally mounted cylinders 603, the piston rods 602, and the pawl elements 605 respectively secured to the outer ends thereof. Unlike the front pair of motors 601F, however, the rear motors 601R are pivotally connected to the opposite ends of a bar 213. The bar 213 is secured between two horizontally extending plates 214 which are rigidly affixed to the front of the channel member 201 of the rear trailer bolster 200, whereby the rear motors 601R are carried by the rear trailer bolster 200 for longitudinal movement therewith. It will also be observed from FIGS. 9 and 10 that in lieu of the pair of U-shaped members 606 that provide the shields for the front motors 601F, each rear motor has a shield 621 which is formed of metal plate. The shield 621 includes top, bottom and side walls and an open outer end through which the pawl element 605 is adapted to pass. It will also be observed from FIG. 9 that the springs 608 for the rear motors 601R are bolted to the respective bearing plates 204, rather than to the I-beams 68.

A threaded bolt 622 is secured to the shaft 613 that passes through the downwardly depending lugs 614 on the end of each cylinder 603. A crank 623 is threaded upwardly onto the bolt 622 until it abuts against the bottom wall of the shield 621. To move the rear cylinder 603 to its inoperative position, the crank 623 is rotated in a clockwise direction, whereupon the bolt 622 moves downwardly through the crank. Because the crank 623 bears against the bottom wall of the shield 621, the cylinder 603 is pulled downwardly. To release the cylinder for operation, the crank 623 is rotated in the counterclockwise direction until it is removed from the bolt 622.

It will be observed in FIGS. 9 and 10 that each of the rear motors 601R includes the junction box 619 affixed to the outer walls of the cylinders 603 substantially adjacent the respective inner ends thereof. A pair of junction blocks 624 is rigidly affixed to the bar 213 carried by the horizontal plates 214, respectively adjacent each end of the bar 213. A pair of flexible conduits 625 extend between each junction block 619 carried by the cylinders 603 and the junction block 624 on the respectively adjacent ends of the bar 213. A pair of flexible conduits 626 extend forwardly from each of the junction blocks 624 on the bar 213, thereby to interconnect the rear motors 601R with the hydraulic pumping system.

To complete the description of the chassis, it will be seen that a suitable take up device, in this case a pair of conduit storage reels 627, is rotatably mounted at a point substantially midway of the length of the horizontal section 64 of the chassis 61. The reels 627 are suitably interconnected with the hydraulic pumping system as indicated by the lines 628 in the plan view of the chassis shown in FIG. 6. The pairs of flexible conduits 626 extending from the junction blocks 624 on bar 213 are operatively connected to the reels 627, so that upon longitudinal movement of the rear bolster 200 relative to the chassis, the reels may be rotated to take up any slack and maintain the conduits 626 as taut as possible.

Still referring to FIGS. 5 and 6, and as heretofore noted, the extreme front end of the chassis 61 carries the upstanding control console 400 that is operatively connected to the hydraulic pumping system provided in the tractor 50. Further, the control console 400 is operatively connected by a conduit system partially shown by the conduits 620, 627 and 628, to the two front motors 601F, the two rear motors 601R, and the two elevator motors 300. Specifically, the control console 400 comprises six individual control devices 401 to 406, inclusive, respectively corresponding to the six named motors; whereby each of the six motors may be individually and selectively controlled in its respective expansion and contraction actions, in any manner well understood in this art. The six control devices 401 to 406, inclusive, are identical; whereby the control device 406 may correspond to one of the rear elevator motors 300, as viewed from above the chassis 61. The control device 406 is essentially comprised of a manually operable lever pivotally mounted adjacent to the lower end thereof to the top of the control console 400, the control lever 406 having front and rear positions respectively corresponding to the expansion position and to the contraction position of the motor 300. Thus, the six motors 300, 601F and 601R, may be selectively and simultaneously manually controlled from the control console 400 by corresponding operation of the appropriate control lever 401 to 406, inclusive.

As previously mentioned, the containers 70 and 80 are virtually identical, and as best shown in FIG. 17, the base 81 of the container 80 carries a pair of laterally extending container bolsters 700 secured to the bottom thereof substantially adjacent the respective opposite ends thereof. The container bolsters 700 are of the type embodying the invention and are described in greater detail hereinafter. Each container bolster 700 includes means defining a row of laterally spaced abutments on the bottom wall thereof, which may take the form of laterally spaced openings 700A therethrough, adapted so as to provide a laterally extending rack 700B thereon to cooperate with the pawls 605 of any one of the motors 601F or 601R as explained more fully below; and the container bolsters 700 essentially comprise elongated hollow structures having the row of openings 700A formed therein adjacent one side and arranged in laterally spaced-apart relation with respect to the base 81 of the container 80, as best shown in FIGS. 14 and 17. The section of the bottom wall of the container bolster opposite the openings 700A provides a bearing surface that is adapted to engage either of the support surfaces 101 or 202 of the respective trailer bolsters 100 and 200. The openings 700A are spaced inwardly from the ends of the base a distance substantially equal to the spacing between the motors and the associated trailer bolsters.

As shown in FIGS. 14 and 15, each pawl 605 comprises two operating lugs 605a and 605b respectively disposed on the opposite sides thereof; and the piston rod 602 is mounted for rotation within the cylinder 603, so that either lug 605a or 605b may be rotated into a top or operative position with respect to a cooperating rack 700B. Specifically, the lug 605a comprises a push or unloading lug, so that when the piston rod 602 is rotated to position the push lug 605a into an upper or operative position, as shown in FIG. 14, the pawl 605 is set into an upper or operative position, as shown in FIG. 14, the pawl 605 is set into pushing or unloading position. On the other hand, the lug 605b comprises a pull or loading lug, so that when the piston rod 602 is rotated to position the pull lug 605b into an upper or operative position, as shown in FIG. 15, the pawl 605 is set into a pulling or loading position.

Considering now the operation of the front and rear motors 601F and 601R to effect unloading of the short container 80 from the side of the chassis 61, and specifically from the front trailer bolster 100 and the rear trailer bolster 200, and referring to FIGS. 4, 14, 15 and 17, the pawl 605 of one of the front motors 601F is first set or operated into its push position, as specifically shown in FIG. 14, so that the push lug 605a thereof is disposed immediately adjacent to the front rack 700B provided by the front container bolster 700 carried by the bottom of the base 81 of the freight container 80 in its loaded position upon the trailer bolsters 100 and 200. Similarly, the pawl 605 of the one of the rear motors 601R on the adjacent side of the chassis 61 is also set or operated into its push position with the push lug 605a thereof disposed immediately adjacent the rack 700B on the opposite end of the container. The crank 623 on one of the rear motors 601R may be removed from the bolt 622, thereby releasing the rear motor for operation. The pin 617 on the corresponding front motor 601F may also be shifted to permit the front motor to move into its operative position. Upon releasing the front and rear motors, the respective push lugs 605a fall into one of the openings 700A in the respectively adjacent racks 700B under the bias of the springs 608. Then the corresponding control levers (assumed to be control levers 402 and 404) may be simultaneously manipulated so as to effect reciprocation of the corresponding rods 602 with respect to the cylinders 603, whereby the push lugs 605a cooperate with the respective racks 700B in order to slide the freight container 80 laterally with respect to the trailer bolsters 100 and 200, and step-by-step from the trailer bolsters onto an adjacent outside support, such as, for example, the deck 92 of the associated railway flatcar 90, as shown in FIG. 4, thereby to cause unloading of the freight container 80 from the trailer bolsters 100 and 200 and from the chassis 61.

The mode of loading the freight container 80 upon the trailer bolsters 100 and 200 from the deck 92 of the railway flatcar 90 is substantially the reverse of that described above, since in this case the pawls 605 of the proper front and rear motors are then rotated to position the associated pull lugs 605b into their upper operative positions, together with movement of the cylinders 603 from their storage positions into their operative positions as shown in FIG. 15. At this time the control levers 402 and 404 may effect reciprocation of the associated piston rods 602, whereby the pull lugs 605a of the pawls 605 cooperate with the associated racks 700B to effect step-by-step pulling of the container 80 in the lateral direction and the consequent side loading of the base 81 of the freight container 80 onto the trailer bolsters 100 and 200.

In view of the above description, it will be understood that the front and rear motors adjacent either side of the chassis are operative in an identical manner; whereby the container 80 may be loaded or unloaded with respect to either side of the chassis 61 and with respect to the associated trailer bolsters 100 and 200. As previously noted, the long container 70 is of virtually identical construction to that of the short container 80; whereby to transfer the long containers onto the trailer bolsters, all that is required is the longitudinal movement of the rear trailer bolster 200 to the appropriate position on the chassis 61. It will, of course, be clear from the foregoing that to transfer freight containers of any of the other lengths represented by the dashed lines 80' in FIG. 3, the rear trailer bolster 200 must be moved longitudinally of the chassis to the position thereon corresponding to the length of the container, whereupon the support surfaces 101 and 202 of the respective trailer bolsters 100 and 200 are spaced-apart the proper distance to accommodate the side loading or side unloading of the associated freight container.

In view of the foregoing, it will be understood that the operation for side loading and side unloading of the various length containers 80' with respect to the chassis 61 is substantially identical to that previously described in conjunction with the side loading and side unloading of the short container 80. More particularly, the bottoms of the various length containers may be fitted with two laterally extending and longitudinally spaced-apart container bolsters 700, as indicated in FIG. 3, which container bolsters are identical to the container bolsters 700 that are carried by the short container 80 as previously described. Since the rear transfer mechanism 600R is carried by the rear trailer bolster 200 for longitudinal movement therewith, it will be clear that the required spacing between the rear trailer bolster and the associated pawl elements will be maintained.

As previously stated, the primary object of the invention is to provide a detachable end bolster that may be easily secured to the base of a freight container, whereby the freight container may be employed in a freight transportation system having side transfer facilities of the type herein described. As heretofore stated, the freight container 80 shown herein is of conventional construction and includes the underlying base 81 and the upstanding walls 82. The freight container 80 further includes four corner reinforcing members respectively secured to the four corners of the base, as indiacted at 83, in FIGS. 18 and 21. Each of the corner reinforcing members 83 has a number of passages therein, including a first generally horizontal passage 84 that extends parallel to the longitudinal axis of the freight container; a second generally horizontal passage 85 that extends parallel to the lateral axis of the freight container 80; and a third passage 86 extending upwardly from the bottom of the reinforcing member 83 through the center thereof. The three passages 84, 85 and 86, intersect at a common point in the reinforcing member 83 and are adapted to receive various devices commonly used either for transferring the freight containers, or for locking the freight containers in position on a railway flatcar or road semi-trailer.

A detachable container bolster of the type contemplated by the present invention for use in combination with a conventionally constructed container having the corner reinforcing members 83, is illustarted in FIGS. 17 through 21, inclusive. The container bolster 700 is preferably made from steel plate, and as shown in FIG. 20, the container bolster 700 comprises a pair of L-shaped members welded to each other to provide the parallel spaced-apart top and bottom walls 701 and 702 respectively, and the spaced-apart inner and outer side walls 703 and 704 respectively. The walls 701 through 704 define an elongated hollow structure having a generally rectangular cross-section equal in length to the width of a standard freight container.

A longitudinally extending and upstanding steel plate 705 is rigidly welded to the top and bottom walls 701 and 702 respectively, midway between the inner and outer side walls 703 and 704 respectively. The plate 705 serves to strengthen the container bolster 700 when it is subjected to the compressive load of a freight container. The bottom wall 702 includes means defining a row of laterally spaced-apart abutments arranged substantially adjacent to the inner side wall 703, the abutments in the embodiment illustrated being provided by the openings 700A. The row of openings 700A provides a laterally extending rack 700B on the bottom wall 702 of the bolster. The rack 700B is adapted to cooperate with the side transfer mechanisms 600F and 600R of the road semi-trailer as heretofore described.

Each of the container bolsters 700 has a pair of upwardly extending projections 706 rigidly secured to the top wall 701 thereof. The projections 706 are arranged respectively adjacent to the outer ends of the container bolster 700 and substantially adjacent to the outer side wall 704 thereof. Each of the projections 706 has a cross-section complementary to the cross-section of the upwardly extending passages 86 in the corner reinforcing members 83 of the freight container. The pair of projections 706 is laterally spaced-apart a distance substantially equal to the distance between the upwardly extending passages 86 in the corner reinforcing members 83 adjacent to the same lateral side of the base 81; whereby it will be understood that when the container bolster 700 is positioned below the base 81, the upwardly extending passages 86 in the corner reinforcing members 83 are adapted respectively to receive the projections 706 in mating relationship and are adapted to cooperate therewith to prevent transverse movement of the container bolster 700 relative to the base 82. A plate 707 is interposed beween each projection 706 and the top wall 701 of the container bolster, and as shown in FIG. 21, the bottom of the corresponding corner reinforcing member is adapted to abut the plate 707.

As best seen in FIG. 17, the upstanding projections 706 are positioned inwardly of the outer side wall 704 a distance substantially equal to the distance between the upstanding passages 86 in the corner reinforcing member 83 and the adjacent lateral side of the base; whereby it will be appreciated that when the container bolster 700 is arranged below the base of the freight container, the outer wall 704 of the container bolster will be disposed substantially parallel to the adjacent lateral side of the associated base.

As best seen in FIGS. 19 and 20, each upstanding projection 706 has a horizontally disposed passage 708 therein; which passage 708 has a cross-section complementary to the second horizontal passages 85 in the corner reinforcing members 83. When the container bolster 700 is arranged below the base 81 and the upstanding projections 706 are disposed within the corresponding passages 86 in the corner reinforcing members 83, the passages 708 in the projections 706 will be in alignment with the corresponding passages 85 in the corner reinforcing members 83; whereby the aligned passages 85 and 708 are adapted to receive suitable fastening means, such as a pin 709 therethrough, whereby the container bolster 700 is detachably secured to the base of the freight container 80. It will, of course, be understood that the passage 708 in each projection 706 may be longitudinally directed rather than laterally directed, and in that case the passage would be in alignment with the corresponding first pasages 84 in the corner reinforcing members 83.

To complete the description of the container bolster 700, it will be seen that a pair of end plates 711 (one only being shown) is rigidly secured to the respective opposite ends thereof. As seen in FIG. 20, the plates 711 are disposed between the outer side wall 704 and the support plate 705. Each end plate 711 is provided with a semi-circular notch 712 therein, which notch is disposed midway of the plate 711; whereby when the container bolster 700 is arranged below the base of the freight container 80, the notch 712 will be disposed below the second laterally extending passage 85 in the corresponding corner reinforcing member 83, as shown in FIG. 17. The end plate 711 is adapted to cooperate with a locking mechanism carried by an associated member, such as the locking devices 500 of the road semi-trailer, as described in greater detail herebelow.

It will, therefore, be apparent that the container bolster 700 herein described provides a rigid laterally extending structure that can be arranged adjacent to and below either end of the base of a freight container of conventional construction, whereby the freight container may be employed in a freight transportation system having side transfer facilities. The container bolster may be secured to the base of any freight container having corner reinforcing members, regardless of the length of the freight container or the material of which the freight container is made. Furthermore, the rigidity of the bolster 700 herein described also serves to strengthen the base of the freight container when secured thereto; this is particularly important when the freight container is made of a leightweight material such as aluminum, which containers cannot normally be used with side loading facilities because of the relative weakness of aluminum and the high stresses placed on the freight containers during pushing and pulling thereof to effect side transferring.

In addition, by providing a detachable container bolster, the freight containers may be employed apart from the road vehicle in a condition with the container bolsters removed from the base. This is extremely important in those instances where the weight of the freight container is critical, such as, for example, the nautical shipping industry, where many of the containers are made of aluminum so as to reduce the dead weight carried by the ship. Moreover, use of the container bolsters herein contemplated permits all the wear resulting from the sliding movement of the freight container over the trailer bolsters to be imparted to the container bolsters rather than to the base of the freight container, thereby prolonging the useful life of the freight container.

As previously noted, the opposite ends of each of the trailer bolsters 100 and 200 respectively carry pairs of anchoring devices 500; whereby it will be appreciated that when any one of the freight containers 70, 80, or 80' is mounted upon the trailer bolsters as previously explained, the anchoring devices 500 are operated into a lock position with respect to the adjacent four corners of the mounted container, so as to anchor the same in place during travel of the road semi-trailer 60. The construction and arrangement of the individual locking devices 500 will best be understood by reference to FIGS. 9 through 12, inclusive; whereby the locking devices 500 each essentially comprises a pair of outwardly extending support plates 501 secured to the respective outer ends of each of the trailer bolsters 100 and 200 immediately below the respective bottom support surfaces 101 and 202 thereof and spaced inwardly from the respective outer guide rails 102 and 203.

A pivot member 502 is carried by a shaft 503, which shaft 503 is pivotally mounted between the support plates 501. The pivot member 502 carries an inwardly extending anchor bolt 504 thereon, whereupon rotation of the pivot member 502 to the upright position (shown in FIGS. 9 through 12), the bolt 504 is adapted to engage the corresponding semi-circular notch 712 provided by the end plates 711 on the detachable container bolsters 700, whereby the freight container is anchored to the trailer bolsters 100 and 200.

A pair of aligned openings 505 is provided in the supports 501, and a similar opening (not shown) is provided in the pivot member 502; whereupon rotation of the pivot member 502 to the upright or lock position, the opening in the pivot member 502 will be in alignment with the openings 505 in the support plates 502 and adapted to receive a locking shaft 506 therethrough. A handle 507 is secured to one end of the shaft 506 to facilitate insertion and removal thereof. The anchor bolt 504 may be released from the container bolsters 700 by removal of the shaft 506, whereby the pivot member 502 is free to rotate outwardly and away from the end of the container bolster 700. If the freight container is equipped with steel plates carrying racks thereon rather than the detachable container bolsters described herein, the locking bolts 504 are adapted to cooperate with the laterally extending passages 85 in the corner reinforcing members 83 of the freight container.

What is claimed is:

1. In combination, a freight container having an elongated longitudinally extending and generally rectangular base, a plurality of corner reinforcing members rigidly affixed to the respective corners of said base, each of said corner reinforcing members having an upwardly extending passage therein, a pair of rigid and laterally extending bolsters arranged adjacent to and below the respective opposite ends of said base, each of said bolsters comprising a hollow structure having generally parallel spaced-apart top and bottom walls and spaced-apart inner and outer side walls, each of said bolsters including means defining a row of laterally spaced-apart abutments on the bottom wall thereof and arranged substantially adjacent to the inner side wall thereof so as to provide a laterally extending rack thereon, each of said bolsters having a pair of upwardly extending projections rigidly secured to said top wall thereof and arranged respectively adjacent to the outer ends thereof and substantially adjacent to said outer side wall, each of said projections having a cross-section complementary to the cross-section of said upwardly extending passages in said corner reinforcing members, said pair of projections being laterally spaced-apart a distance substantially equal to the distance between said upwardly extending passages in said corner reinforcing members adjacent to the same lateral side of said base, whereby said corner reinforcing members respectively receive said projections in mating relationship and cooperate therewith to prevent transverse movement of said bolsters relative to said base, and fastening means for detachably securing said bolsters respectively to the opposite ends of said base, whereby said freight container with said bolsters secured thereto may be employed in a freight transportation system having side transfer facilities adapted to cooperate with said racks to effect sidewise transferring of said freight container, and whereby said freight container may be employed in a condition with said bolsters detached from said base.

2. In combination, a freight container having an elongated longitudinally extending and generally rectangular base, a plurality of corner reinforcing members rigidly affixed to the respective corners of said base, each of said corner reinforcing members having an upwardly extending passage therein, a pair of rigid and laterally extending bolsters arranged adjacent to and below the respective opposite ends of said base, each of said bolsters comprising a hollow structure having generally parallel spaced-apart top and bottom walls and spaced-apart inner and outer side walls, each of said bolsters including means defining a row of laterally spaced-apart abutments on the bottom wall thereof and arranged substantially adjacent to the inner side wall thereof so as to provide a laterally extending rack thereon, each of said bolsters having a pair of upwardly extending projections rigidly secured to the top wall thereof and arranged respectively adjacent to the outer ends thereof and substantially adjacent to the outer side wall, each of said projections having a cross-section complementary to the cross-section of said upwardly extending passages in said corner reinforcing members, said pair of projections being laterally spaced-apart a distance substantially equal to the distance between said upwardly extending passages in said corner reinforcing members adjacent to the same lateral side of said base, whereby said corner reinforcing members respectively receive said projections in mating relationship and cooperate therewith to prevent transverse movement of said bolsters relative to said base, each of said bolsters having a pair of end plates respectively secured to the outer ends thereof, each of said end plates having an opening therethrough adapted respectively to receive a pair of laterally directed locking bolts carried by an associated member whereby said bolster may be anchored to the associated member, and fastening means for detachably securing said bolsters respectively to the opposite ends of said base, whereby said freight container with said bolsters secured thereto may be employed in a freight transportation system having side transfer facilities adapted to cooperate with said racks to effect sidewise transferring of said freight container, and whereby said freight container may be employed in a condition with said bolsters detached from said base.

3. In combination, a freight container having an elongated longitudinally extending and generally rectangular base, a plurality of corner reinforcing members rigidly affixed to the respective corners of said base, each of said corner reinforcing members having an upwardly extending passage therein and at least one horizontally directed passage therethrough, a pair of rigid and laterally extending bolsters arranged adjacent to and below the respective opposite ends of said base, each of said bolsters comprising a hollow structure having generally parallel spaced-apart top and bottom walls and spaced-apart inner and outer side walls, each of said bolsters including means defining a row of laterally spaced-apart abutments on the bottom wall thereof and arranged substantially adjacent to the inner side wall thereof so as to provide a laterally extending rack thereon, each of said bolsters having a pair of upwardly extending projections rigidly secured to the top wall thereof and arranged respectively adjacent to the outer ends thereof and substantially adjacent to the outer side wall, each of said projections having a cross-section complementary to the cross-section of said upwardly extending passages in said corner reinforcing members and having a horizontally directed passage therethrough, said pair of projections being laterally spaced-apart a distance substantially equal to the distance between said upwardly extending passages in said corner reinforcing members adjacent to the same lateral side of said base, whereby said upwardly extending passages in said corner reinforcing members are adapted respectively to receive said pairs of projections in mating relationship, with said horizontally directed passages in said projections being in alignment with said horizontally directed passages in said corresponding corner reinforcing members, and removable fastening means respectively disposed in said aligned horizontally directed passages for detachably securing said bolsters to the respective opposite ends of said base, whereby said freight container with said bolsters secured thereto may be employed in a frieght transportation system having side transfer facilities adapted to cooperate with said racks to effect sidewise transferring of said freight container, and whereby said freight container may be employed in a condition with said bolsters detached from said base.

4. A detachable bolster adapted to be secured to a freight container carrying on the bottom thereof an elongated longitudinally extending and generally rectangular base and having a plurality of corner reinforcing members rigidly affixed to the respective corners thereof, and wherein each of the corner reinforcing members has an upwardly extending passage therein and a second horizontally directed passage therethrough, said bolster comprising: a rigid elongated hollow structure having generally parallel spaced-apart top and bottom walls and spaced-apart inner and outer side walls, said bolster including means defining a row of longitudinally spaced-apart abutments on said bottom wall thereof and arranged substantially adjacent to said inner side wall thereof so as to provide a laterally extending rack thereon, said bolster having a pair of upwardly extending projections rigidly secured to said top wall thereof and arranged respectively adjacent to the outer ends thereof and substantially adjacent to said outer side wall, each of said projections having a cross-section complementary to the cross-section of the upwardly extending passages in the corner reinforcing members of an associated freight container and having a horizontally directed passage therethrough complementary to the horizontally directed passages in the corresponding corner reinforcing members of the associated freight container, said pair of projections being spaced-apart a distance substantially equal to the distance between the upwardly extending passages in the corner reinforcing members which are adjacent to the same lateral side of the base of the associated freight container, whereupon positioning said bolster laterally with respect to the base of the associated freight container the corner reinforcing members adjacent the same lateral side of the base are adapted respectively to receive said projections in mating relationship, with said passages in said projections being in alignment with the horizontally directed passages in the corresponding corner reinforcing members and adapted to receive fastening means therethrough whereby said bolster is adapted to be detachably secured to the base of the associated freight container, and whereby a freight container carrying a pair of said bolsters adjacent to and below the respective opposite ends thereof may be employed in a freight transportation system having side transfer facilities adapted to cooperate with the racks provided by said bolsters to effect sidewise transferring of the freight container.

References Cited

UNITED STATES PATENTS

| | | | |
|---|---|---|---|
| 3,219,218 | 11/1965 | Hand | 214—516 |
| 3,310,188 | 3/1967 | Dempster | 214—516 |

ALBERT J. MAKAY, *Primary Examiner.*

U.S. Cl. X.R.

220—1.5; 296—28